US010303900B2

(12) United States Patent
Chhabra et al.

(10) Patent No.: US 10,303,900 B2
(45) Date of Patent: May 28, 2019

(54) TECHNOLOGIES FOR SECURE PROGRAMMING OF A CRYPTOGRAPHIC ENGINE FOR TRUSTED I/O

(71) Applicant: INTEL CORPORATION, Santa Clara, CA (US)

(72) Inventors: Siddhartha Chhabra, Hillsboro, OR (US); Gideon Gerzon, Zichron Yaakov (IL); Reshma Lal, Hillsboro, OR (US); Bin Xing, Hillsboro, OR (US); Pradeep M. Pappachan, Hillsboro, OR (US); Steven B. McGowan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 14/979,002

(22) Filed: Dec. 22, 2015

(65) Prior Publication Data

US 2017/0024584 A1    Jan. 26, 2017

Related U.S. Application Data

(60) Provisional application No. 62/195,600, filed on Jul. 22, 2015, provisional application No. 62/195,595, (Continued)

(51) Int. Cl.
*H04L 9/08* (2006.01)
*H04L 9/32* (2006.01)
(Continued)

(52) U.S. Cl.
CPC .............. *G06F 21/72* (2013.01); *G06F 21/57* (2013.01); *H04L 9/0861* (2013.01); *H04L 9/3242* (2013.01)

(58) Field of Classification Search
None
See application file for complete search history.

(56) References Cited

U.S. PATENT DOCUMENTS

| 7,716,389 B1 | 5/2010 | Bruce et al. |
| 9,058,494 B2 | 6/2015 | Xing |

(Continued)

FOREIGN PATENT DOCUMENTS

WO    2013/147872    10/2013

OTHER PUBLICATIONS

International search report for PCT application PCT/US2016/038396, dated Sep. 23, 2016 (3 pages).

(Continued)

*Primary Examiner* — Joseph P Hirl
*Assistant Examiner* — Hassan Saadoun
(74) *Attorney, Agent, or Firm* — Barnes & Thornburg LLP

(57) ABSTRACT

Technologies for secure programming of a cryptographic engine include a computing device with a cryptographic engine and one or more I/O controllers. The computing device establishes, an invoking secure enclave using secure enclave support of a processor. The invoking enclave configures channel programming information, including a channel key, and invokes a processor instruction with the channel programming information as a parameter. The processor generates wrapped programming information including an encrypted channel key and a message authentication code. The encrypted channel key is protected with a key known only to the processor. The invoking enclave provides the wrapped programming information to untrusted software, which invokes a processor instruction with the wrapped programming information as a parameter. The processor unwraps and verifies the wrapped programming information and then programs the cryptographic engine. The processor generates an authenticated response that may be verified by the invoking enclave. Other embodiments are described and claimed.

25 Claims, 7 Drawing Sheets

Related U.S. Application Data filed on Jul. 22, 2015, provisional application No. 62/195,148, filed on Jul. 21, 2015, provisional application No. 62/194,763, filed on Jul. 20, 2015.

(51) Int. Cl.
*G06F 21/72* (2013.01)
*G06F 21/57* (2013.01)

(56) References Cited

U.S. PATENT DOCUMENTS

| | | | |
|---|---|---|---|
| 9,059,855 B2* | 6/2015 | Johnson | G06F 21/10 |
| 9,553,721 B2* | 1/2017 | Keidar | G06F 21/74 |
| 2003/0147537 A1* | 8/2003 | Jing | H04L 9/0841 |
| | | | 380/277 |
| 2005/0193201 A1* | 9/2005 | Rahman | G06F 21/305 |
| | | | 713/169 |
| 2008/0209203 A1 | 8/2008 | Haneda | |
| 2011/0161675 A1 | 6/2011 | Diard | |
| 2011/0225431 A1 | 9/2011 | Stufflebeam, Jr. et al. | |
| 2012/0281836 A1* | 11/2012 | Arnold | H04L 9/088 |
| | | | 380/277 |
| 2014/0188732 A1 | 7/2014 | Kobres | |

OTHER PUBLICATIONS

Extended European search report for European patent application No. 16828191.3, dated Feb. 19, 2019 (5 pages).

* cited by examiner

TMP_SEQID := Sample from a 64-bit monotonic counter
     maintained by hardware
TMP_IV := TMP_SEQID || {63'b0} || 1'b1
BIND_STRUCT.SEQID := TMP_SEQID
AUTH_HEADER := BIND_STRUCT.BTID || BIND_STRUCT.BTSVN ||
     BIND_STRUCT.BTPOLICY || BIND_STRUCT.CID_IP ||
     BIND_STRUCT.NONCE || BIND_STRUCT.SEQID ||
     BIND_STRUCTUE.COMMAND
<CT, MAC>:= AES_GCM(KWK, TMP_IV, AUTH_HEADER, TKEY)
BIND_STRUCT.TKEY := CT
BIND_STRUCT.MAC := MAC TMP_IV := BIND_STRUCT.SEQID || {63'b0} || 1'b1
AUTH_HEADER := BIND_STRUCT.BTID || BIND_STRUCT.BTSVN ||
        EBIND_STRUCT.BTDATA || EBIND_STRUCT.NONCE ||
        EBIND_STRUCT.SEQID ||
<PT, REF_MAC>:= AES_GCM(KWK, TMP_IV, AUTH_HEADER,
        EBIND_STRUCT.TKEY)
Compare REF_MAC with EBIND_STRUCT.MAC. If the two match,
proceed to block 816, else indicate the unwrap failure in
ERROR_STRUCT

TECHNOLOGIES FOR SECURE PROGRAMMING OF A CRYPTOGRAPHIC ENGINE FOR TRUSTED I/O

CROSS-REFERENCE TO RELATED APPLICATIONS

The present application claims priority under 35 U.S.C. § 119(e) to U.S. Provisional Patent Application Ser. No. 62/194,763, entitled "CRYPTOGRAPHIC PROTECTION OF I/O DATA FOR DMA CAPABLE I/O CONTROLLERS," which was filed on Jul. 20, 2015, to U.S. Provisional Patent Application Ser. No. 62/195,148, entitled "CRYPTOGRAPHIC PROTECTION OF I/O DATA FOR DMA CAPABLE I/O CONTROLLERS," which was filed on Jul. 21, 2015, to U.S. Provisional Patent Application Ser. No. 62/195,595, entitled "TECHNOLOGIES FOR SECURE PROGRAMMING OF A COMMON CRYPTO ENGINE FOR TRUSTED I/O," which was filed on Jul. 22, 2015, and to U.S. Provisional Patent Application Ser. No. 62/195,600, entitled "TECHNOLOGIES FOR SECURE COMMAND UNWRAPPING AND ERROR REPORTING FOR TRUSTED I/O," which was filed on Jul. 22, 2015.

BACKGROUND

Typical computing devices may rely on software agents, such as anti-malware agents, for security. However, it is difficult to keep up with the increasing number of malware attacks on users' devices. To combat the malware threat, there is a trend to protect security sensitive software by running it inside a Trusted Execution Environment (TEE). TEEs provide a sterile environment that can protect secrets even when other parts of the system are compromised. Examples of TEEs include Intel® Software Guard Extensions (Intel® SGX), secure virtual machines (VMs), and a converged security engine (CSE). The TEE, while useful to protect secrets within the TEE, may not protect I/O data such as user and sensor data that is communicated into and/or out of the secure "container." The security requirements for trusted I/O vary per use case and device, and involve flavors and combinations of confidentiality, integrity, liveliness, and replay protection.

On a personal computer platform, securing I/O has several complexities. To protect I/O for a given usage, many input devices may need to be secured because the platform often has multiple devices of the same category connected via different I/O controllers, and a user may dynamically select any one of the connected devices during use. For example, when inputting text, the user may choose to use an embedded keyboard, a USB keyboard, or a Bluetooth (BT) keyboard. The user may also use a touch screen to input data. This means all keyboards and touch input may need to be secured for a usage that requires secure text input. Additionally, I/O devices may be used by secure applications and by regular applications, which means that those devices may be required to switch dynamically from being protected to being in the clear and vice versa.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
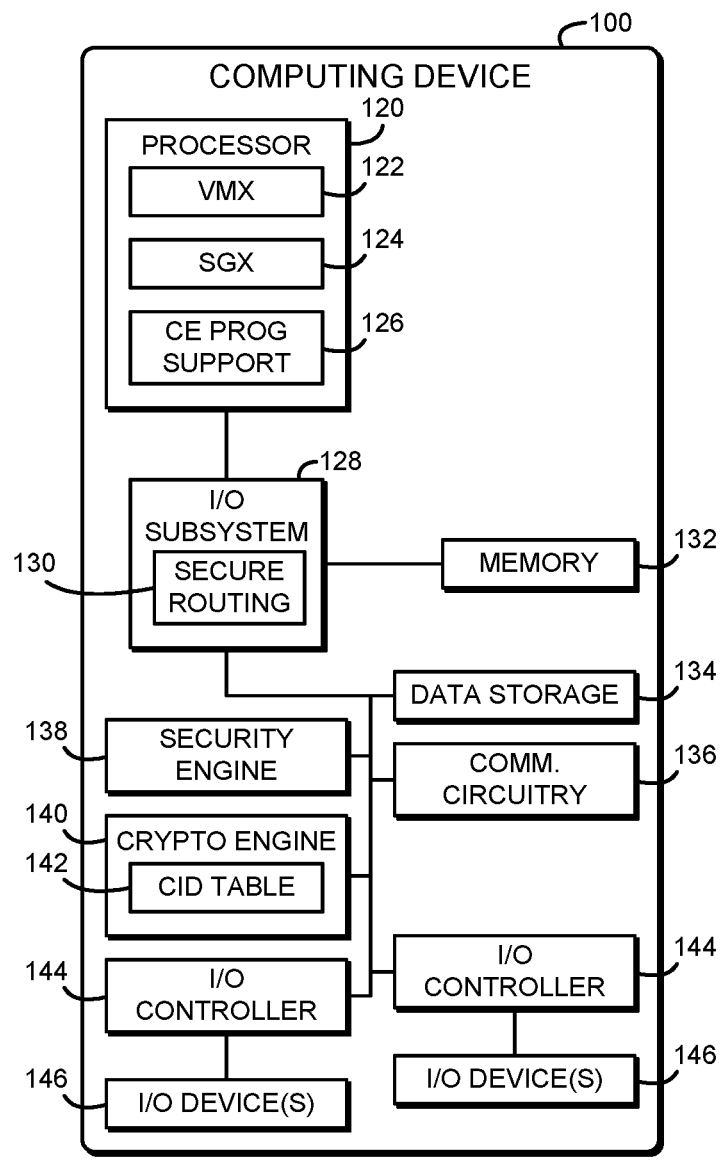
FIG. 1 is a simplified block diagram of at least one embodiment of a computing device for secure programming of a central cryptographic engine.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for secure I/O includes, among other components, a processor 120, main memory 132, a hardware cryptographic engine 140, and one or more I/O controllers 144 in communication with one or more I/O devices 146. In use, the cryptographic engine 140 provides on-the-fly encryption and decryption of data transferred via direct memory access (DMA) transactions between the platform I/O controllers 144 and the memory 132. Each DMA transaction is tagged with a channel ID (CID) representing a flow of data associated with a particular I/O device 146 or set of I/O devices 146. The cryptographic engine 140 uses the CID to reliably identify transactions that must be protected, retrieve the corresponding encryption keys, and perform appropriate cryptographic operations on the DMA data. The cryptographic engine 140 is programmed, for example with channel information and associated encryption keys, by trusted software using one or more specialized instructions of the processor 120 to generate wrapped programming information. The trusted software provides the wrapped programming information to untrusted software such as a kernel-mode driver. The untrusted software invokes an unwrapping engine using one or more specialized instructions of the processor 120 to unwrap the programming information and program the cryptographic engine 140. By using specialized processor 120 instructions to wrap the programming information, the computing device 100 may ensure that only trusted software programs the cryptographic engine 140. By allowing untrusted software to invoke the unwrapping engine, the computing device 100 allows system software (e.g., an operating system and/or VMM) to manage programming of the cryptographic engine 140. Additionally, by performing wrapping and/or unwrapping with the processor 120, the computing device 100 may reduce complexity of the cryptographic engine 140.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 128, a memory 132, a data storage device 134, and communication circuitry 136. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 132, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 may include hardware virtualization support 122, secure enclave support 124, and crypto engine programming support 126.

The hardware virtualization support 122 supports virtualized execution of operating systems, applications, and other software by the computing device 100. The hardware virtualization support 122 may include virtual machine extensions (VMX) support by providing two modes of execution: VMX-root mode and VMX non-root mode. The VMX-root mode allows executing software to have broad control of the computing device 100 and its hardware resources. Conversely, a hypervisor, virtual machine monitor (VMM), or host operating system (OS) may execute in VMX-root mode. The VMX non-root mode restricts access to certain hardware instructions while still implementing the ordinary ring/privilege system of the processor 120. One or more guest OSs may execute in the VMX non-root mode. Those guest OSs may execute in ring zero, similar to being executed without virtualization. The hardware virtualization support 122 may also support extended page tables (EPT), which may be embodied as hardware-assisted second-level page address translation. The hardware virtualization support 122 may be embodied as, for example, Intel® VT-x technology.

The secure enclave support 124 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 132. The secure enclave support 124 may be embodied as a set of processor instruction extensions that allows the processor 120 to establish one or more secure enclaves in the memory 132. For example, the secure enclave support 124 may be embodied as Intel® Software Guard Extensions (SGX) technology.

The crypto engine programming support 126 allows the processor 120 to program the cryptographic engine 140 to provide cryptographic protection of I/O data. In particular, the processor 120 may enable or disable encryption for certain I/O channels, and may securely provide encryption keys to the cryptographic engine 140. The crypto engine programming support 126 may be embodied as one or more specialized processor instructions (e.g., the instructions EBINDTIO, UNWRAP, or other instructions) and associated hardware, microcode, firmware, or other components of the processor 120.

The memory 132 may be embodied as any type of volatile or non-volatile memory or data storage capable of performing the functions described herein. In operation, the memory 132 may store various data and software used during operation of the computing device 100 such as operating systems, applications, programs, libraries, and drivers. The memory 132 is communicatively coupled to the processor 120 via the I/O subsystem 128, which may be embodied as circuitry and/or components to facilitate input/output operations with the processor 120, the memory 132, and other components of the computing device 100. For example, the I/O subsystem 128 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. The I/O subsystem 128 may further include secure routing support 130. The secure routing support 130 includes hardware support to ensure I/O data cannot be misrouted in the fabric 128 under the influence of rogue software. The secure routing support 130 may be used with the cryptographic engine 140 to provide cryptographic protection of I/O data. In some embodiments, the I/O subsystem 128 may form a portion of a system-on-a-chip (SoC) and be incorporated, along with the processor 120, the memory 132, and other components of the computing device 100, on a single integrated circuit chip.

The data storage device 134 may be embodied as any type of device or devices configured for short-term or long-term storage of data such as, for example, memory devices and circuits, memory cards, hard disk drives, solid-state drives, or other data storage devices. In some embodiments, the data storage device 134 may be used to store the contents of one or more secure enclaves. When stored by the data storage device 134, the contents of the secure enclave may be encrypted to prevent unauthorized access.

The communication circuitry 136 of the computing device 100 may be embodied as any communication circuit, device, or collection thereof, capable of enabling communications between the computing device 100 and other remote devices over a network. The communication circuitry 136 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing device 100 may include a security engine 138, which may be embodied as any hardware component(s) or circuitry capable of providing security-related services to the computing device 100. In particular, the security engine 138 may include a microprocessor, microcontroller, or other embedded controller capable of executing firmware and/or other code independently and securely from the processor 120. Thus, the security engine 138 may be used to establish a trusted execution environment separate from code executed by the processor 120. The security engine 138 may communicate with the processor 120 and/or other components of the computing device 100 over a dedicated bus, such as a host embedded controller interface (HECI). The security engine 138 may also provide remote configuration, control, or management of the computing device 100. In the illustrative embodiment, the security engine 138 is embodied as a converged security and manageability engine (CSME) incorporated in a system-on-a-chip (SoC) of the computing device 100. In some embodiments, the security engine 138 may be embodied as a manageability engine, an out-of-band processor, a Trusted Platform Module (TPM), or other security engine device or collection of devices. Further, in some embodiments, the security engine 138 is also capable of communicating using the communication circuitry 136 or a dedicated communication circuit independently of the state of the computing device 100 (e.g., independently of the state of the main processor 120), also known as "out-of-band" communication.

The cryptographic engine 140 may be embodied as any microcontroller, microprocessor, functional block, logic, or other circuit or collection of circuits capable of performing the functions described herein. As further described below, the cryptographic engine 140 may encrypt and/or decrypt I/O data read or written by the I/O controllers 144 in one or more direct memory access (DMA) operations to the memory 132. The cryptographic engine 140 includes an internal channel identifier (CID) table 142, which the cryptographic engine 140 uses to dynamically identify DMA channel(s) to be protected. The CID table 142 may be controlled and/or programmed by trusted software, for example using the crypto engine programming support 126 of the processor 120. The encryption keys and/or other secret information of the CID table 142 are not available to untrusted software. In some embodiments, the cryptographic engine 140 may be incorporated along with the I/O subsystem 128 and/or the processor 120 in a system-on-a-chip (SoC) of the computing device 100.

Similarly, the I/O controllers 144 may be embodied as any embedded controller, microcontroller, microprocessor, functional block, logic, or other circuit or collection of circuits capable of performing the functions described herein. In some embodiments, one or more of the I/O controllers 144 may be embedded in another component of the computing device 100 such as the I/O subsystem 128 and/or the processor 120. Additionally or alternatively, one or more of the I/O controllers 144 may be connected to the I/O subsystem 128 and/or the processor 120 via an expansion bus such as PCI Express (PCIe) or other I/O connection. As further described below, the I/O controllers 144 communicate with one or more I/O devices 146, for example over a peripheral communications bus (e.g., USB, Bluetooth, etc.). The I/O devices 146 may be embodied as any I/O device, such as human interface devices, keyboards, mice, touch screens, microphones, cameras, and other input devices, as well as displays and other output devices. As described above, the I/O controllers 144 and associated DMA channels are uniquely identified using identifiers called channel identifiers (CIDs). Each I/O controller 144 may assert an appropriate CID with every DMA transaction, for example as part of a transaction layer packet (TLP) prefix, to uniquely identify the source of the DMA transaction and provide liveness protections. The CID also enables the isolation of I/O from different devices 146.

Figure 2:
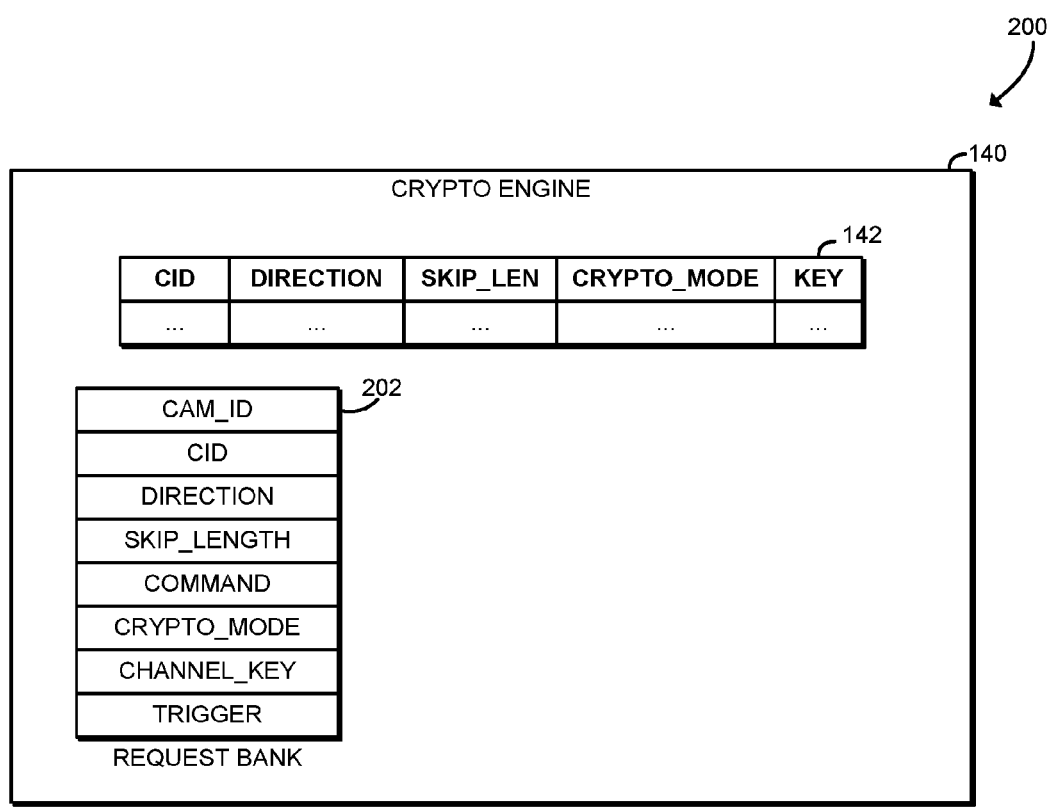
FIG. 2 is a simplified block diagram of at least one embodiment of the cryptographic engine of the computing device of FIG. 1.

Referring now to FIG. 2, diagram 200 illustrates hardware of the cryptographic engine 140 at a high level. As shown, the CE hardware 140 implements a CID table 142 and a request bank 202. In some embodiments, the CID table 142 may be embodied as content addressable memory (CAM) 142. The CID table 142 is loaded with channel information associated with a trusted channel such as CID, direction of the trusted channel (e.g., input or output), skip length, cryptographic mode, and the associated channel key. The CIDs are platform implementation defined values. For example, the CID may include a controller identifier field and a channel number field. The size of the respective fields and their assigned values may be platform 100 and/or controller 144 dependent. Thus, it should be understood that the fields shown in the CID table 142 are illustrative, and that in some embodiments, additional fields may be stored with each CID entry in the CID table 142, which may allow the cryptographic engine 140 to manage DMA transactions.

In use, the cryptographic engine 140 snoops all DMA transactions generated by the I/O controllers 144 to the memory 132. On each transaction to or from a device 146 capable of participating in trusted I/O, the cryptographic engine 140 references the CID table 142 to find the CID corresponding to the DMA channel in the CID table 142. A match indicates that the channel is currently protected and that the cryptographic engine 140 should use the channel key associated with the channel to protect the data written to and/or the data read from memory 132 (depending on the direction of the channel). The request bank 202 represents a set of registers that receive the unwrapped channel programming information for programming a channel from the untrusted software. As described below, the request bank 202 may receive the unwrapped channel programming from the processor 120 via a sideband interface that it inaccessible to software executed by the computing device 100.

Figure 3:
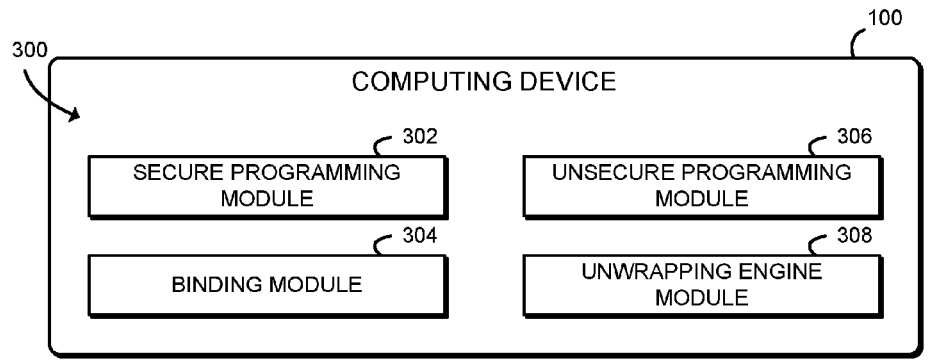
FIG. 3 is a simplified block diagram of at least one embodiment of an environment that may be established by the computing device of FIG. 1

Referring now to FIG. 3, in an illustrative embodiment, the computing device 100 establishes an environment 300 during operation. The illustrative environment 300 includes a secure programming module 302, a binding module 304, an unsecure programming module 306, and an unwrapping engine module 308. The various modules of the environment 300 may be embodied as hardware, firmware, microcode, software, or a combination thereof. As such, in some embodiments, one or more of the modules of the environment 300 may be embodied as circuitry or collection of electrical devices (e.g., secure programming circuitry 302, binding circuitry 304, unsecure programming circuitry 306, and/or unwrapping engine circuitry 308). It should be appreciated that, in such embodiments, one or more of the secure programming circuitry 302, the binding circuitry 304, the unsecure programming circuitry 306, and/or the unwrapping engine circuitry 308 may form a portion of one or more of the processor 120, the I/O subsystem 128, the cryptographic engine 140, and/or other components of the computing device 100. Additionally, in some embodiments, one or more of the illustrative modules may form a portion of another module and/or one or more of the illustrative modules may be independent of one another.

The secure programming module 302 is configured to establish, with the secure enclave support 124 of the processor 120, a secure enclave called an invoking enclave. The secure programming module 302 is further configured to configure, by the invoking enclave, channel programming information. The channel programming information includes a channel identifier and a channel key that are to be programmed to the cryptographic engine 140. The secure programming module 302 is further configured to invoke, by the invoking enclave, a processor instruction of the processor 120 with the channel programming information as a parameter. The secure programming module 302 may be further configured to provide, by the invoking enclave, wrapped programming information to an untrusted kernel mode component of the computing device 100. In some embodiments, the secure programming module 302 may be further configured to receive, by the invoking enclave, an authenticated response from the untrusted kernel mode component in response to providing the wrapped programming information to the untrusted kernel mode component, and verify the authenticated response with the channel key and a random nonce of the channel programming information.

The binding module 304 is configured to generate, by the processor 120, the wrapped programming information based on the channel programming information in response to invocation of the processor instruction by the invoking enclave. The wrapped programming information includes an encrypted channel key and a message authentication code generated over the channel programming information.

The unsecure programming module 306 is configured to receive, by the untrusted kernel mode component, the wrapped programming information from the invoking enclave and to invoke, by the untrusted kernel mode component, a processor instruction of the processor 120 with the wrapped programming information as a parameter. As described above, the wrapped programming information includes an encrypted channel key to be programmed to the cryptographic engine 140. The unsecure programming module 306 may be further configured to read, by the untrusted kernel mode component, an authenticated response generated by the processor 120 and provide the authenticated response to the invoking enclave.

The unwrapping engine module 308 is configured to unwrap, by the processor 120, the wrapped programming information to generate the channel programming information in response to invocation of the processor instruction by the untrusted kernel mode component. As described the channel programming information includes an unencrypted channel key. The unwrapping engine module 308 is further configured to verify the channel programming information and program the unencrypted channel key to the cryptographic engine 140 in response to verifying the channel programming information. The unwrapping engine module 308 may be further configured to determine whether the wrapped programming information is potentially replayed and if so, indicate an unwrapping error. The unwrapping engine module 308 is further configured to determine, by the processor 120, whether one or more target-specific programming checks are satisfied and, if not, indicate an error. The unwrapping engine module 308 is further configured to generate, by the processor 120, an authenticated response based on programming status in response to verifying the channel programming information.

Figure 4:
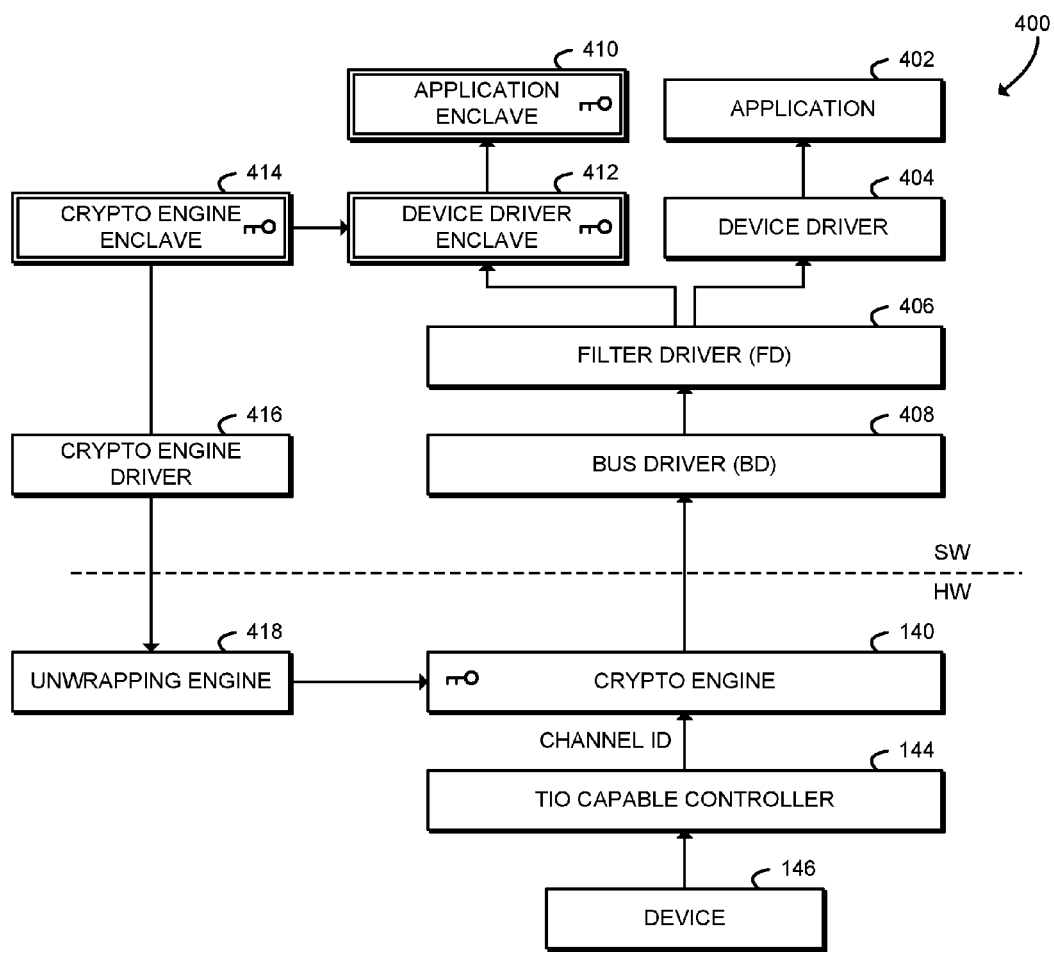
FIG. 4 is a simplified block diagram of at least one embodiment of a system architecture that may be established by the computing device of FIGS. 1-3.

Referring now to FIG. 4, diagram 400 illustrates a system architecture that may be established by the computing device 100. The system architecture may include an untrusted I/O stack including an application 402, a device driver 404, a filter driver 406, and a bus driver 408. The untrusted I/O stack may receive unprotected (i.e., plaintext) I/O data from the I/O controllers 144 via the cryptographic engine 140 and process the I/O data as normal. The system architecture may also include a trusted I/O stack including an application enclave 410 and a device driver enclave 412. Each of the enclaves 410, 412 may be established using the secure enclave support 124 of the processor 120 and thus may be trusted. As shown, each of the enclaves 410, 412 may be provisioned with encryption keys associated with one or more DMA channels. Thus, the application enclave 410 and/or the device driver enclave 412 may securely decrypt and process secure I/O data generated from the I/O devices 146 via the cryptographic engine 140. As shown, each secure enclave 410, 412 may receive secure I/O data via components of the untrusted I/O stack, such as the bus driver 408 and/or the filter driver 406. In particular, I/O control and routing may be performed by the untrusted I/O stack, and because the payload of the secure I/O data is encrypted, the secure I/O data remains protected. Accordingly, the untrusted I/O stack need not be included in the trusted code base of the computing device 100. In some embodiments, the untrusted I/O stack, including the filter driver 406, the bus driver 408, and/or other untrusted I/O components may be re-used or otherwise shared with an ordinary operating system of the computing device 100.

As shown, the system architecture 400 further includes a crypto engine enclave 414, a crypto engine driver 416, and an unwrapping engine 418, which may be used to program the cryptographic engine 140. The crypto engine enclave 414 may be embodied as user-level (e.g., ring-3) code protected with the secure enclave support 124 of the processor 120 and thus may be trusted. The crypto engine enclave 414 maintains or otherwise has access to encryption keys associated with one or more DMA channels. The crypto engine enclave 414 may provision the trusted I/O stack with the encryption keys. The crypto engine enclave 414 may also program the cryptographic engine 140 using the crypto engine programming support 126 of the processor 120. In particular, the crypto engine enclave 414 may execute one or more specialized processor instruction to prepare a binary blob including wrapped channel programming information, including wrapped encryption keys that may be used to program the cryptographic engine 140. The crypto engine enclave 414 may provide the binary blob to the crypto engine driver 416, which may be embodied as a kernel-level untrusted software component. The crypto engine driver 416 provides the binary blob to the unwrapping engine 418, which may unwrap and verify the binary blob and, if verified, program the channel programming information to the cryptographic engine 140. Thus, the crypto engine driver 416 may allow an operating system or other control software of the computing device 100 to manage programming of the cryptographic engine 140 without requiring the operating system to have access to the plaintext encryption keys for the DMA channels. In the illustrative embodiment, the unwrapping engine 418 is provided by hardware and/or microcode resources of the processor 120; however, in some embodiments the functions of the unwrapping engine 418 may be performed by non-core components of the processor 120 (i.e., the processor uncore), the cryptographic engine 140, and/or other components of the computing device 100.

Figure 5:
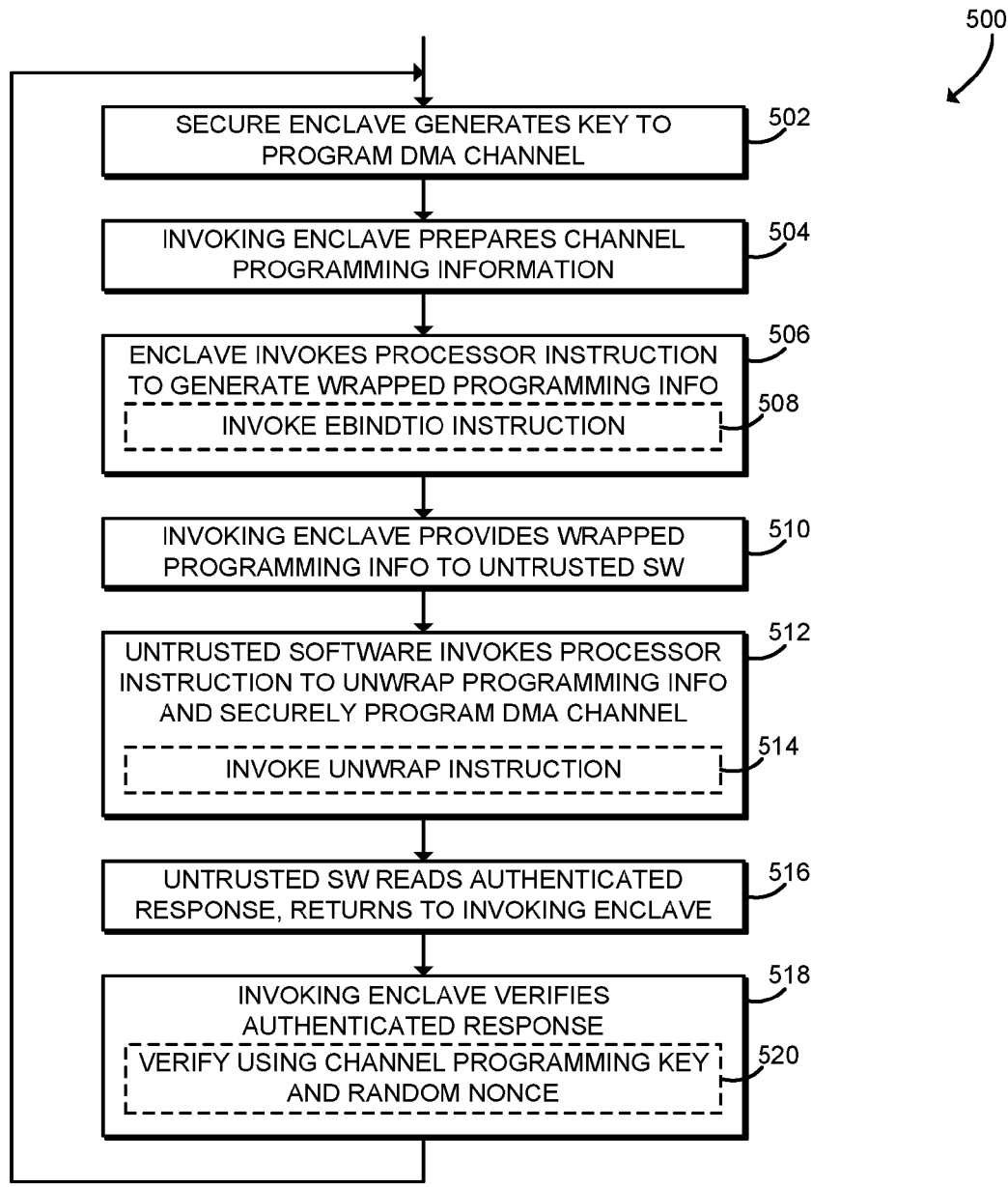
FIG. 5 is a simplified flow diagram of at least one embodiment of a method for secure programming of a central cryptographic engine that may be executed by the computing device of FIGS. 1-4.

Referring now to FIG. 5, in use, the computing device 100 may execute a method 500 for secure programming of the cryptographic engine 140. The method 500 may be executed by hardware, firmware, processor microcode, software, or other execution resources of the computing device 100. The method 500 begins with block 502, in which a secure enclave generates a key to program the DMA channel. For example, in some embodiments the crypto engine enclave (CEE) 414 may generate the key used to program the DMA channel. The key may include a channel key used to protect I/O data transmitted over the DMA channel. Therefore, the secure enclave may also provide the channel key to other trusted components of the computing device 100 that may access the protected I/O data, such as the application enclave 410 and/or the device driver enclave 412. The secure enclave may retain the channel programming key to verify an authenticated response generated by the cryptographic engine 140, as described further below.

In block 504, the invoking secure enclave (e.g., the CEE 414) prepares channel programming information to be used to program the DMA channel. The channel programming information may include the encryption key as determined in block 502 as well as other programming information, such as the channel identifier (CID) of the DMA channel to be programmed, a programming command, a random nonce that may be used for authentication and replay protection, and other programming information. To prepare the programming information, the invoking enclave may, for example, allocate a structure in memory including the programming information, also called a "binary blob." In some embodiments, the programming information may be stored in a structure known as a BIND_STRUCT, which may include fields as described below in Table 1.

TABLE 1

| Bind key structure (BIND_STRUCT). | | | | |
|---|---|---|---|---|
| Name of Offset | Offset | Size (B) | Description | Set by |
| BTID | 0 | 4 | Target device | Software |
| BTSVN | 4 | 4 | Target security version number | Software |
| BTPOLICY | 8 | 16 | Target device policy | Software |
| CID_IO | 24 | 4 | Channel ID to be programmed. MSB indicates input or output | Software |
| TKEY | 28 | 16 | Channel key for the target | Software |
| NONCE | 44 | 8 | Nonce for authenticated responses | Software |
| COMMAND | 52 | 4 | Programming commands to the target device | Software |
| SEQID | 56 | 8 | Seed for generating initialization vector (IV) | Hardware |
| MAC | 64 | 16 | MAC on encrypted keys, policy, target ID, SVN, CID_IO, NONCE, and INVOCATN_CTR | Hardware |
| RSVD | 80 | 48 | Reserved | Hardware |

The bind target ID (BTID) field in BIND_STRUCT is set up by the invoking enclave, which will eventually invoke a processor instruction to program to a target device. The target device is illustratively the cryptographic engine 140, although is some embodiments the computing device 100 may support alternative target devices. The BTID field is set to the identifier of the target device (e.g., the cryptographic engine 140) to enable the unwrapping engine 418 to direct the programming to the desired target device. In the illustrative embodiment, the CEE 414 sets up the BTID field to include the target ID of the cryptographic engine 140. It should be understood that in some embodiments, the programming information may be bound to an endpoint other than the cryptographic engine 140.

The bind target security version number (BTSVN) field is set up by the invoking entity and contains the security version number (SVN) for any firmware running on the endpoint device (e.g., the cryptographic engine 140). In some embodiments, the cryptographic engine 140 of the computing device 100 may not include any firmware and thus the BTSVN field must be zero (MBZ). The bind target policy (BTPOLICY) field is set up by the invoking enclave and contains the policy that must be applied to the data being processed by the target device (e.g., the cryptographic engine 140). In some embodiments, the cryptographic engine 140 may not support any defined policy and thus this field must be zero (MBZ).

The channel ID (CID_IO) field is set up by the invoking enclave and contains the channel identifier and the direction of the channel (i.e., input or output) that the invoking enclave is attempting to program. The CID_IO field is used by the invoking enclave to program the channel identifier of the DMA channel being protected for trusted I/O. In some embodiments, CID_IO may include more than four bytes. The TKEY field is set up by the invoking enclave and contains the encryption key to be programmed to the target device (e.g., the cryptographic engine 140). This key may be used to protect I/O data communicated over the DMA channel.

The random nonce field is set up by the invoking enclave and contains a random nonce which is used by the cryptographic engine 140 for generating an authenticated response as described further below. The authenticated response may be used by the invoking enclave to verify that the programming attempt to the cryptographic engine 140 was successful.

The command (COMMAND) field is set up by the invoking enclave and indicates the type of programming to be done for the target device (e.g., the cryptographic engine 140). The cryptographic engine 140 may support one or more commands, including protecting a channel (CH_PROTECT), unprotecting a channel (CH_UNPROTECT), reprogramming a channel with a different key (CH_REPROGRAM), or querying for the key associated with a channel (QUERY_KEY).

As shown, the BIND_STRUCT structure may also include fields that are set by hardware of the processor 120, including a sequence number (SEQID) and a message authentication code (MAC). Generation of those fields by the processor 120 is described further below. Of course, the BIND_STRUCT structure illustrates one potential embodiment of the channel programming information, and the programming information may be stored in different formats in other embodiments. For example, in some embodiments, the programming information may include variable amounts of target-specific data and/or wrapped data, as well as associated size fields that may be interpreted by the processor 120.

Still referring to FIG. 5, in block 506, the invoking enclave invokes a processor instruction of the processor 120 to generate wrapped programming information. The invoking enclave may pass the BIND_STRUCT including the channel programming key as a parameter to the processor instruction. The processor 120 encrypts the key of the channel programming information to generate an encrypted key. The processor 120 may encrypt the key using a key wrapping key (KWK) known only to the processor 120 and the unwrapping engine 418. The processor 120 may generate and include a sequence number in the wrapped programming information for replay protection, and the processor 120 may generate a MAC over the channel programming information for integrity protection. The processor 120 may modify the BIND_STRUCT to contain the wrapped programming information. In some embodiments, in block 508 the invoking enclave may invoke an EBINDTIO instruction. The EBINDTIO instruction may be embodied as a user-level (e.g., ring 3) instruction. One potential embodiment of a method for executing the EBINDTIO instruction is described below in connection with FIG. 6.

In block 510, the invoking enclave provides the wrapped programming information to untrusted, kernel-mode software of the computing device, such as the crypto engine driver 416. Because the wrapped programming information has been encrypted and bound to the cryptographic engine 140, sensitive data in the channel programming information (e.g., the channel programming key) may not be accessed by the untrusted software. The untrusted software may inspect unprotected fields of the wrapped programming information (e.g., the CID_IO and COMMAND fields) to determine whether to allow the programming attempt. Thus, kernel-mode software such as the crypto engine driver 416 may manage programming of the cryptographic engine 140 without being trusted or otherwise capable of accessing the protected I/O data.

In block 512, the untrusted software (e.g., the crypto engine driver 416) invokes a processor instruction of the processor 120 to unwrap the programming information and securely program the DMA channel. For example, the crypto engine driver 416 may invoke a processor instruction that causes the unwrapping engine 418 (e.g., the processor 120 and/or the cryptographic engine 140) to decrypt the channel programming key, verify the channel programming information, and otherwise program the DMA channel. To program the cryptographic engine 140, the unwrapping engine 418 may copy the channel programming information into an appropriate entry of the CID table 142, clear an entry of the CID table 142 identified by the channel programming information, or otherwise modify the CID table 142. After programming, the unwrapping engine 418 and/or cryptographic engine 140 generates an authenticated response indicating the programming status and/or the unwrapping status. In some embodiments, in block 514 the untrusted software invokes an UNWRAP instruction of the processor 120. The UNWRAP instruction may be embodied as a kernel-level (e.g., ring 0) instruction. In some embodiments, the UNWRAP instruction may generate a virtual machine exit (VMExit), allowing a VMM and/or hypervisor to manage virtualization of the UNWRAP instruction. One potential embodiment of a method for executing the UNWRAP instruction is described below in connection with FIGS. 8A and 8B.

In block 516, the untrusted software (e.g., the crypto engine driver 416) reads the authenticated response from the memory 132 and returns the authenticated response to the invoking enclave (e.g., to the CEE 414). The untrusted software may also evaluate unencrypted fields of the authenticated response, such as a programming status code and/or an unwrapping status code. In block 518, the invoking enclave verifies the authenticated response. Verifying the authenticated response allows the invoking enclave to determine whether the cryptographic engine 140 successfully completed the programming request. Thus, after verifying the authenticated response the invoking enclave (e.g., the CEE 414) may, for example, allow the application enclave 410 and/or the device driver enclave 412 to use the secure DMA channel. In some embodiments, in block 520 the invoking enclave may verify the authenticated response using the channel programming key and the random nonce that were included in the original channel programming information. For example, the authenticated response may include a message authentication code over the programming status that can be verifying using the channel programming key and the random nonce. After verifying the authenticated response, the method 500 loops back to block 502, in which the computing device 100 may program additional DMA channels.

Figures 6, 7:
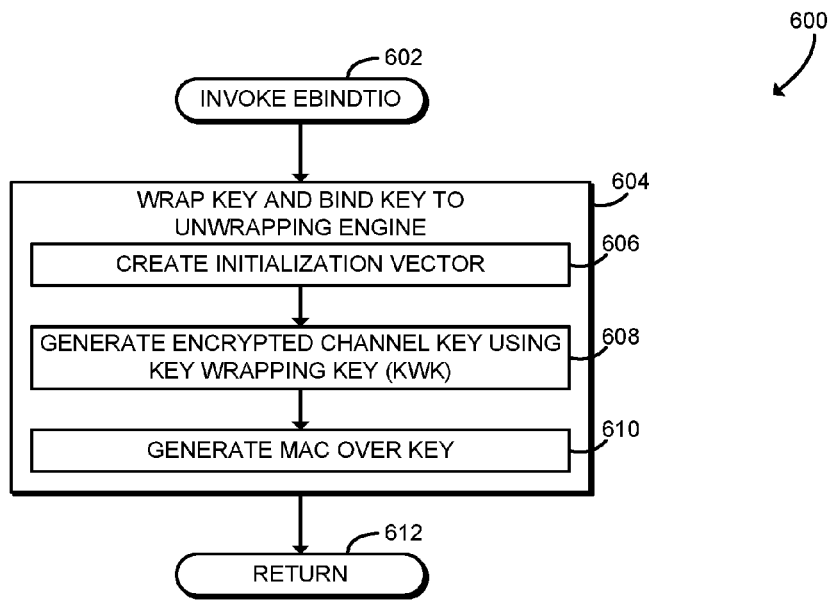
FIG. 6 is a simplified flow diagram of at least one embodiment of a method for secure programming information binding that may be executed by a processor of the computing device of FIGS. 1-4.
FIG. 7 is pseudocode illustrating at least one embodiment of the method of FIG. 6.

Referring now to FIG. 6, in use, the computing device 100 may execute a method 600 for secure programming information binding. The method 600 may be executed by hardware, firmware, processor microcode, or other execution resources of the processor 120. Thus, the method 600 may have a hardware root of trust (i.e., the processor 120). The method 600 begins with block 602, in which the computing device 100 invokes the ENBINDTIO processor instruction. As described above in connection with block 506 of FIG. 5, a secure enclave such as the cryptographic engine enclave (CEE) 414 may invoke the EBINDTIO instruction. The invoking enclave provides channel programming information as a parameter to the EBINDTIO instruction. For example, a pointer to a BIND_STRUCT including the channel programming information may be passed in a register of the processor 120 such as RCX. In some embodiments, in response to invocation of the EBINDTIO instruction, the processor 120 may verify that a particular enclave (e.g., the CEE 414) has invoked the processor, for example by determining whether one or more attributes of the invoking enclave are set.

In block 604, the processor 120 wraps the encryption key and binds the encryption key to the unwrapping engine 418. In particular, the processor 120 encrypts the channel programming key and generates a message authentication code (MAC) to integrity-protect the channel programming information. In block 606, the processor 120 creates an initialization vector (IV) for the wrapping and binding process. The processor 120 may generate a sequence ID on each EBINDTIO invocation by using an internally maintained monotonic counter. The sequence ID is used to construct the initialization vector for the cryptographic wrapping. Constructing the initialization vector may be performed as described by the AES-GCM standard. The processor 120 also stores the sequence ID in the SEQID field of the BIND_STRUCT. The SEQID field may be used as an invocation counter to indicate the count for the EBINDTIO invocations on the computing device 100, which may be used for replay protection as described further below.

In block 608, the processor 120 encrypts the channel programming key using a key wrapping key (KWK) to create the encrypted channel key. As described above, the KWK is known only to the processor 120 and the unwrapping engine 418. In the illustrative embodiment, the processor 120 encrypts the channel key using the AES-GCM algorithm. Of course, the processor 120 may use any appropriate cryptographic algorithm to encrypt the channel key. The processor 120 may store the encrypted channel key in the TKEY field of the BIND_STRUCT object. In block 610, processor 120 generates a message authentication code (MAC) over the encrypted channel key and other BIND_STRUCT fields. For example, in the illustrative embodiment, the MAC is generated over the BIND_STRUCT fields BTID, BTSVN, BTPOLICY, CID_IO, NONCE, SEQID, COMMAND, and the encrypted channel programming key. The MAC is stored in the MAC field of the BIND_STRUCT and allows the unwrapping engine 418 to verify that the wrapped programming information was not modified while transitioning through untrusted software of the computing device 100.

In block 612, the processor 120 returns from executing the EBINDTIO instruction. The processor 120 may, for example, resume executing the next instruction of invoking enclave (e.g., the CEE 414). After executing the EBINDTIO instruction, the memory 132 includes the wrapped programming information. For example, the SEQID, TKEY, and MAC fields of the BIND_STRUCT may include values stored by the processor 120 during execution of the EBINDTIO instruction. After returning, the method 600 is completed.

Referring now to FIG. 7, pseudocode 700 illustrates one potential embodiment of the EBINDTIO instruction. The pseudocode 700 may illustrate, for example, microcode of the processor 120 associated with the EBINDTIO instruction. As shown, the processor 120 generates a sequence ID by sampling a 64-bit monotonic counter, generates the initialization vector from the sequence ID, and stores the sequence ID in the BIND_STRUCT. The processor 120 generates an authentication header over several fields of the BIND_STRUCT, and then performs an AES-GCM authenticated encryption operation using the KWK, the initialization vector, the authentication header, and the channel programming key. The processor 120 next stores the cipher text and the message authentication code produced by the authenticated encryption operation into the BIND_STRUCT.

Figure 8A:
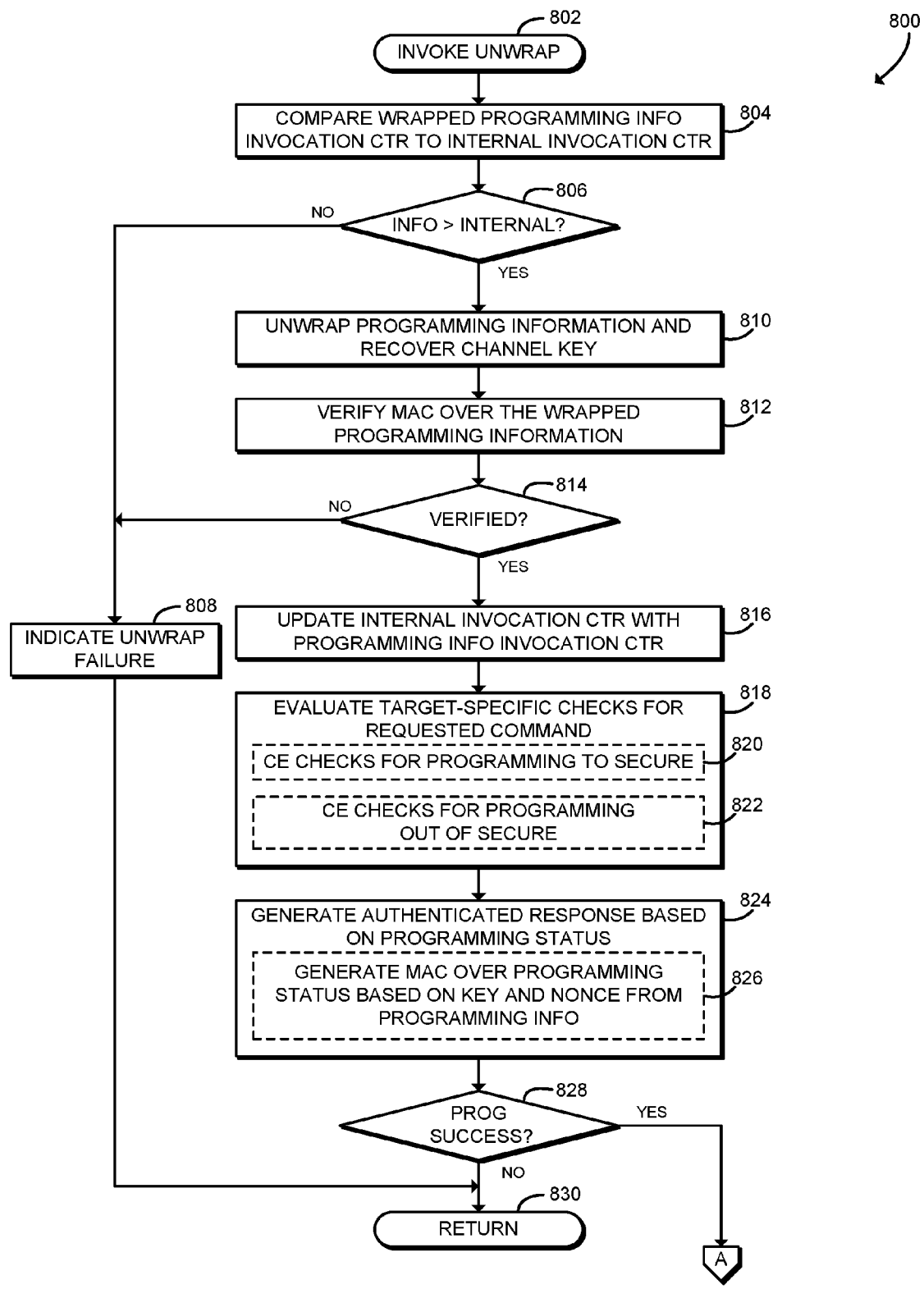
FIGS. 8A and 8B are a simplified flow diagram of at least one embodiment of a method for secure programming information unwrapping that may be executed by the processor of the computing device of FIGS. 1-4.
Figures 8B, 9:
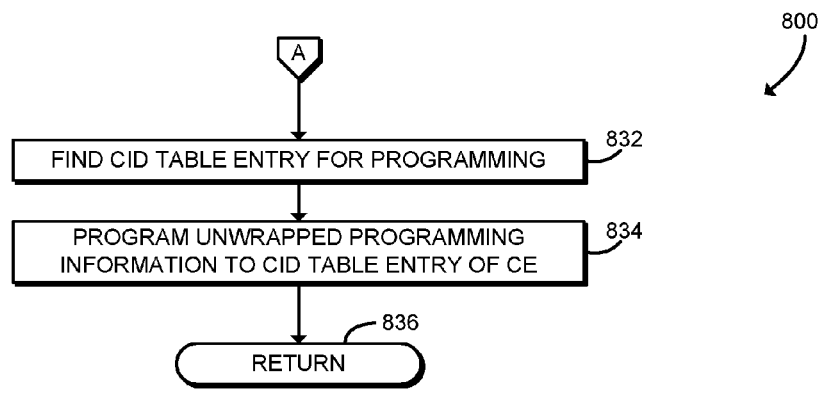
FIG. 9 is pseudocode illustrating at least one embodiment of the method of FIGS. 8A and 8B.

Referring now to FIGS. 8A and 8B, in use, the computing device 100 may execute a method 800 for secure programming information unwrapping. The method 800 may be executed by hardware, firmware, processor microcode, or other execution resources of the processor 120. The method 800 begins with block 802, in which the computing device 100 invokes the UNWRAP processor instruction. As described above in connection with block 512 of FIG. 5, an untrusted kernel-mode (e.g., ring-0) software entity such as the crypto engine driver 416 may invoke the UNWRAP instruction. The calling untrusted software provides the wrapped programming information as a parameter to the UNWRAP instruction. For example, a pointer to a BIND_STRUCT including the wrapped programming information may be passed in a register of the processor 120 such as RCX.

In block 804, the processor 120 compares an invocation counter included in the wrapped programming information to an internal invocation counter. For example, the processor 120 may compare the SEQID field of a BIND_STRUCT that includes the wrapped programming information to the internal invocation counter. The internal invocation counter is initialized to zero and may be incremented in response to a successful invocation of the UNWRAP instruction as described further below. In block 806, the processor 120 determines whether the invocation counter received with the wrapped programming information is greater than the internal invocation counter. If not, the unwrapping attempt may be a replay attack using the wrapped programming information. If the invocation counter received with the wrapped programming information is greater than the internal invocation counter, the method 800 advances to block 810, described below. If the invocation counter received with the wrapped programming information is not greater than the internal invocation counter, the method 800 branches to block 808.

In block 808, the processor 120 indicates an unwrapping failure. For example, the processor 120 may write an appropriate error code in a response structure in the memory 132. In some embodiments, the response may be stored in a structure known as a UNWRAP_RESPONSE_STRUCT, which may include fields as described below in Table 2. The untrusted software (e.g., the crypto engine driver 416) may allocate space for the UNWRAP_RESPONSE_STRUCT in memory, and may pass a pointer to the UNWRAP_RESPONSE_STRUCT as a parameter to the UNWRAP instruction. To indicate the unwrapping code due to a suspected replay attack, the UNWRAP_STATUS field may be set to '10.' After indicating the unwrap failure, the method 800 branches ahead to block 830, in which the processor 120 returns from executing the UNWRAP instruction and the method 800 is completed.

TABLE 2

UNWRAP_RESPONSE_STRUCT

| Name of Offset | Offset | Size (B) | Description |
| --- | --- | --- | --- |
| UNWRAP_STATUS | 0 | 1 | Bit 0: Unwrap Status (0: Success, 1: Failure), Bit 1 and 2: Failure reason (00: MAC failure, 01: Device Busy, 10: Replayed blob) |
| AUTHENTICATED_RSP | 1 | 25 | Authenticated Response - valid only if there were no unwrap errors, indicated by the unwrap status |
| RSVD | 26 | 38 | Reserved (must be zero) |

Referring back to block 806, if the invocation counter of the wrapped programming information is greater than the internal invocation counter, the method 800 advances to block 810. In block 810, the processor 120 unwraps the wrapped programming information and recovers the channel programming key. The processor 120 may decrypt the TKEY field of the BIND_STRUCT using the key wrapping key (KWK), which is known only to the processor 120 and the unwrapping engine 418 (which, in the illustrative embodiment, is also the processor 120). In the illustrative embodiment, the processor 120 decrypts the channel key using the AES-GCM algorithm. Of course, the processor 120 may use any appropriate cryptographic algorithm to decrypt the channel key In block 812, the processor 120 verifies the MAC over the wrapped programming information. For example, the processor 120 may verify the MAC over the channel key and other BIND_STRUCT fields using an authenticated encryption algorithm such as AES-GCM. In some embodiments, the processor 120 may verify the MAC over the BIND_STRUCT fields BTID, BTSVN, BTPOLICY, CID_IO, NONCE, SEQID, COMMAND, and the channel key. Of course, the processor 120 may use any appropriate cryptographic algorithm to verify that the wrapped programming information has not been modified while transitioning through untrusted software. In block 814, the processor 120 determines whether the MAC was verified. If not, the method 800 branches to block 808, in which the processor 120 indicates an unwrapping failure as described above. In particular, the processor 120 may indicate MAC failure by setting the UNWRAP_STATUS field of the UNWRAP_RESPONSE_STRUCT to '00.' In some embodiments, the processor 120 may also indicate unwrap failure if the UNWRAP instruction is invoked while another unwrap request is in progress by setting the UNWRAP_STATUS field of the UNWRAP_RESPONSE_STRUCT to '01' to indicate that the unwrapping engine 418 is busy. For example, the UNWRAP instruction may maintain a lock to protect shared state used by the UNWRAP instruction. After indicating the unwrap failure, the method 800 branches ahead to block 830, in which the processor 120 returns from executing the UNWRAP instruction and the method 800 is completed.

Referring back to block 814, if the MAC was verified, then the method 800 advances to block 816, in which the processor 120 updates its internal invocation counter with the invocation counter of the wrapped programming information. For example, the processor 120 may update the internal invocation counter to match the value of the SEQID field of the BIND_STRUCT object. As described above, updating the internal invocation counter may allow the processor 120 to detect attempted replay attacks.

In block 818, the processor 120 evaluates one or more target-specific checks associated with the requested programming channel programming command. The target-specific checks may verify protect the computing device 100 from malicious attack, for example by checking the consistency and/or correctness of the channel programming information. Performing the target-specific checks by the processor 120 may reduce the complexity and/or cost of the programming target. In the illustrative embodiment, the checks performed are specific to the cryptographic engine 140; however, in other embodiments the checks may be appropriate for any other component that is the target of the programming attempt.

In some embodiments, in block 820, the processor 120 may perform checks specific to the cryptographic engine 140 for commands to program a DMA channel to secure. The processor 120 may check that the channel ID received with the wrapped programming information (e.g., the BIND_STRUCT object) is not currently present in the CID table 142 of the cryptographic engine 140. In other words, the processor 120 may check that the DMA channel being programmed is not already secure. Additionally or alternatively, the processor 120 may check if there is an available entry in the CID table 142 for the programming request; that is, the processor 120 may check whether the CID table 142 is full. In order to perform those checks, the processor 120 may model the state of the CID table 142 based on the channel programming requests received. Modeling the state on the processor 120 may reduce the complexity of the cryptographic engine 140 hardware.

In some embodiments, in block 822, the processor 120 may perform checks specific to the cryptographic engine 140 for commands to program a DMA channel out of secure. The processor 120 may check that the channel ID received with the wrapped programming information (e.g., the BIND_STRUCT object) is currently programmed to secure, for example by ensuring that the received CID and direction (e.g., input and/or output) match a CID and direction combination in the CID table 142. Additionally or alternatively, the processor 120 may check that the channel programming key passed with the wrapped programming information is the same as the current channel key. By requiring the same channel programming key, the processor 120 may ensure that the same enclave that programmed the DMA channel to secure (e.g., the CEE 414) also programs the DMA channel out of secure. As described above, in order to perform those checks, the processor 120 may model the state of the CID table 142 based on the channel programming requests received.

In block 824, the processor 120 generates an authenticated response based on the programming status of the cryptographic engine 140. The authenticated response generated may have two elements, the unwrap status to indicate the status of unwrap of the EBIND blob, and a cryptographic response which is an encrypted/authenticated response representing the programming status of the CID table 142. The cryptographic response allows the invoking enclave (e.g., the CEE 414) to verify that the untrusted software actually initiated the cryptographic engine 140 programming by calling UNWRAP. For example, as described above, the authenticated response may be represented by the UNWRAP_RESPONSE_STRUCT, with the UNWRAP_STATUS field representing the unwrapping status and the AUTHENTICATED_RSP field representing the programming status. The AUTHENTICATED_RSP field may include one or more status codes or other predefined values. For example, AUTHENTICATED_RSP may include CH_PROG_SUCCESS to indicate programming was successful, CH_PROG_CAMID_UNAVAILABLE to indicate no CID table 142 entries are available for programming, CH_ALREADY_PROG to indicate that a DMA channel requested to be secure is already secure, CH_PROG_CID_UNAVAILABLE to indicate a channel ID requested to be out of secure is not in use, and/or CH_PROG_CUR_KEY_MISMATCH to indicate a channel key of the request does not match the current channel key.

In order to construct the encrypted response, each programming attempt may generate a status and optional data. In the illustrative embodiment, none of the commands for the cryptographic engine 140 return data; however it should be understood that in some embodiments data such as secret keys may be returned. The status indicates the status of the programming and can be used by both the untrusted software as well as the invoking enclave. Thus, in in order to allow both the untrusted software and the invoking enclave to inspect the programming status, the programming status may be integrity-protected but not encrypted. Of course, the optional data may be both integrity-protected and encrypted, preventing untrusted software from accessing the data.

In some embodiments, in block 826, a message authentication code for the authenticated response may be generated over the programming status using the random nonce provided by the invoking enclave in the BIND_STRUCT structure as the initialization vector, and using the encryption key included in the programming attempt. Thus, the invoking enclave includes a key (e.g., in the TKEY field of the BIND_STRUCT) with each programming attempt, even when programming a DMA channel out of secure. The response generated also includes a MAC over the encrypted response data and the status. As described above, the invoking enclave, on receiving this response, verifies the MAC using the random nonce and the key that it included with the original programming attempt. A successful verification of the MAC indicates that the programming attempt was sent to the cryptographic engine 140 through the UNWRAP instruction because only the unwrapping engine 418 may unwrap the EBIND_STRUCT, recover the key included with UNWRAP, and generate the MAC using this key included in the original programming attempt. The mechanism used also guarantees that the response cannot be modified by the untrusted software without detection, as the MAC verification by the invoking enclave will fail if there was an attempt to modify the authenticated response.

In block 828, the processor 120 determines whether channel programming was successful. The processor 120 may, for example, determine whether the BIND_STRUCT object was successfully unwrapped and whether the target-specific checks for the requested command were satisfied. If the channel programming was not successful, the method 800 advances to block 830, in which the processor 120 returns from executing the UNWRAP instruction and the method 800 is completed. As described above, the UNWRAP_RESPONSE_STRUCT object includes an authenticated response indicating that programming was unsuccessful.

Referring back to block 828, if the processor 120 determines that channel programming was successful, the method 800 branches to block 832, shown in FIG. 8B. In block 832, the processor 120 finds an appropriate entry in the CID table 142 for programming. As described above, the processor 120 may model the state of the CID table 142 based on the channel programming requests received. For example, the processor 120 may maintain a copy of the contents of the CID table 142 in memory and update the copy in response to successful programming attempts. For a request to program a channel to secure, the processor 120 may search the model of the CID table 142 for an available entry. For a request to program a channel out of secure, the processor 120 may search the model of the CID table 142 for the entry corresponding to the specified CID.

In block 834, the processor 120 programs the unwrapped programming information to the selected entry of the CID table 142 of the cryptographic engine 140. The processor 120 may use any technique to program the cryptographic engine 140. For example, the processor 120 may set one or more registers of the request bank 202 maintained by the cryptographic engine 140 using a sideband interface that is unavailable to software executed by the processor 120. After programming, the CID table 142 of the cryptographic engine 140 is updated based on the requested command In block 836, the processor 120 returns from executing the UNWRAP instruction and the method 800 is completed. As described above, when returning after a successful programming, the UNWRAP_RESPONSE_STRUCT object includes an authenticated response indicating that programming was successful.

Referring now to FIG. 9, pseudocode 900 illustrates one potential embodiment of the UNWRAP instruction. The pseudocode 900 may illustrate, for example, microcode of the processor 120 associated with the UNWRAP instruction. As shown, the processor 120 generates a temporary initialization vector based on the sequence ID field of the BIND_STRUCT object. The processor 120 generates an authentication header over several fields of the BIND_STRUCT, and then performs an AES-GCM authenticated encryption operation using the KWK, the temporary initialization vector, the authentication header, and the channel key. The processor 120 next compares the reference MAC generated by the AES-GCM authenticated encryption operation with the MAC provided in the BIND_STRUCT object. If those values match, the processor 120 proceeds to evaluate target-specific checks and program the cryptographic engine 140 as described in block 816. If those values do not match, the processor 120 indicates the unwrap failure in an error structure, such as the UNWRAP_RESPONSE_STRUCT.

It should be appreciated that, in some embodiments, the methods 500, 600, and/or 800 may be embodied as various instructions stored on a computer-readable media, which may be executed by the processor 120, the cryptographic engine 140, and/or other components of the computing device 100 to cause the computing device 100 to perform the corresponding method 500, 600, and/or 800. The computer-readable media may be embodied as any type of media capable of being read by the computing device 100 including, but not limited to, the memory 132, the data storage device 134, microcode of the processor 120, memory of the cryptographic engine 140, firmware of the cryptographic engine 140, and/or other media.

EXAMPLES

Illustrative examples of the technologies disclosed herein are provided below. An embodiment of the technologies may include any one or more, and any combination of, the examples described below.

Example 1 includes a computing device for secure cryptographic engine programming, the computing device comprising: a secure programming module to (i) establish, by a processor of a computing device with secure enclave support, an invoking enclave, (ii) configure, by the invoking enclave, channel programming information, wherein the channel programming information includes a channel identifier and a channel key to be programmed to a cryptographic engine of the computing device, and (ii) invoke, by the invoking enclave, a processor instruction with the channel programming information as a parameter; and a binding module to generate, by the processor, wrapped programming information based on the channel programming information in response to invocation of the processor instruction, wherein the wrapped programming information comprises an encrypted channel key and a message authentication code.

Example 2 includes the subject matter of Example 1, and wherein the processor instruction comprises an EBINDTIO instruction.

Example 3 includes the subject matter of any of Examples 1 and 2, and wherein: the channel programming information comprises a binary structure indicative of the channel programming information; and to generate the wrapped programming information comprises to modify the binary structure to generate the wrapped programming information.

Example 4 includes the subject matter of any of Examples 1-3, and wherein to generate the wrapped programming information comprises to encrypt the channel key with a key wrapping key to generate the encrypted channel key, wherein the key wrapping key is a secret of the processor.

Example 5 includes the subject matter of any of Examples 1-4, and wherein to generate the wrapped programming information further comprises to generate the message authentication code with the key wrapping key.

Example 6 includes the subject matter of any of any of Examples 1-5, and wherein the secure programming module is further to provide, by the invoking enclave, the wrapped programming information to an untrusted kernel mode component of the computing device.

Example 7 includes the subject matter of any of Examples 1-6, and wherein the untrusted kernel mode component comprises a crypto engine driver of the computing device.

Example 8 includes the subject matter of any of Examples 1-7, and wherein: the secure programming module is further to (i) receive, by the invoking enclave, an authenticated response from the untrusted kernel mode component in response to provision of the wrapped programming information to the untrusted kernel mode component, and (ii) verify, by the invoking enclave, the authenticated response with the channel key and a random nonce of the channel programming information; and to configure the channel programming information comprises to generate the random nonce.

Example 9 includes the subject matter of any of Examples 1-8, and further comprising: an unsecure programming module to invoke, by the untrusted kernel mode component, a second processor instruction with the wrapped programming information as a parameter in response to provision of the wrapped programming instruction to the untrusted kernel mode component; and an unwrapping engine module to (i) unwrap, by the processor, the wrapped programming information to generate the channel programming information in response to invocation of the second processor instruction, (ii) verify the channel programming information in response to the invocation of the second processor instruction, and (iii) program the channel key to the cryptographic engine in response to verification of the channel programming information.

Example 10 includes a computing device for secure cryptographic engine programming, the computing device comprising: an unsecure programming module to (i) receive, by an untrusted kernel mode component of a computing device, wrapped programming information, wherein the wrapped programming information includes an encrypted channel key to be programmed to a cryptographic engine of the computing device, and (ii) invoke, by the untrusted kernel mode component, a processor instruction with the wrapped programming information as a parameter; and an unwrapping engine module to (i) unwrap, by a processor of the computing device, the wrapped programming information to generate channel programming information in response to invocation of the processor instruction, wherein the channel programming information includes an unencrypted channel key, (ii) verify, by the processor, the channel programming information, and (iii) program, by the processor, the unencrypted channel key to the cryptographic engine in response to verification of the channel programming information.

Example 11 includes the subject matter of Example 10, and wherein the processor instruction comprises an UNWRAP instruction.

Example 12 includes the subject matter of any of Examples 10 and 11, and wherein the untrusted kernel mode component comprises a crypto engine driver of the computing device.

Example 13 includes the subject matter of any of Examples 10-12, and wherein to unwrap the wrapped programming information to generate the channel programming information comprises to decrypt the encrypted channel key with a key wrapping key to generate the unencrypted channel key, wherein the key wrapping key is a secret of the processor.

Example 14 includes the subject matter of any of Examples 10-13, and wherein: the unwrapping engine module is further to (i) determine whether the wrapped programming information is potentially replayed, and (ii) indicate, by the processor, an unwrapping error in response to a determination that the wrapped programming information is potentially replayed; wherein to unwrap the wrapped programming information comprises to unwrap the wrapped programming information in response to a determination that the wrapped programming information is not potentially replayed.

Example 15 includes the subject matter of any of Examples 10-14, and wherein to determine whether the wrapped programming information is potentially replayed comprises to: determine whether an invocation counter of the wrapped programming information has a predefined relationship to an internal invocation counter of the processor; and update the internal invocation counter with the invocation counter of the wrapped programming information in response to the verification of the channel programming information.

Example 16 includes the subject matter of any of Examples 10-15, and wherein to verify the channel programming information comprises to verify a message authentication code of the wrapped programming information with the channel programming information.

Example 17 includes the subject matter of any of Examples 10-16, and wherein: the unwrapping engine module is further to (i) determine, by the processor, whether a target-specific programming check is satisfied in response to the verification of the channel programming information, and (ii) indicate, by the processor, an error in response to determining that the target-specific programming check is not satisfied; wherein to program the unencrypted channel key to the cryptographic engine further comprising to program the unencrypted channel key to the cryptographic engine in response to a determination that the target-specific programming check is satisfied.

Example 18 includes the subject matter of any of Examples 10-17, and wherein: the channel programming information comprises a command to program a DMA channel to secure; and to determine whether the target-specific programming check is satisfied comprises to determine whether the DMA channel indicated by the channel programming information is already programmed, or to determine whether a channel identifier table of the crypto engine is full.

Example 19 includes the subject matter of any of Examples 10-18, and wherein: the channel programming information comprises a command to program a DMA channel out of secure; and to determine whether the target-specific programming check is satisfied comprises to determine whether the DMA channel is already programmed or to determine whether the unencrypted channel key matches a current channel key associated with the DMA channel.

Example 20 includes the subject matter of any of Examples 10-19, and wherein to program the unencrypted channel key to the cryptographic engine comprises to: determine an index of an available channel identifier table entry of the crypto engine with a crypto engine model maintained by the processor; and write the channel programming information at the index of the available channel identifier table entry.

Example 21 includes the subject matter of any of Examples 10-20, and wherein the unwrapping engine module is further to generate, by the processor, an authenticated response based on a programming status in response to the verification of the channel programming information.

Example 22 includes the subject matter of any of Examples 10-21, and wherein to generate the authenticated response comprises to generate a message authentication code over the programming status with the unencrypted channel key and a random nonce of the channel programming information.

Example 23 includes the subject matter of any of Examples 10-22, and wherein: the unsecure programming module is further to read, by the untrusted kernel mode component, the authenticated response in response to generation of the authenticated response; and the computing device further comprises a secure programming module to (i) establish, by the processor, an invoking enclave with secure enclave support of the processor, and (ii) verify, by the invoking enclave, the authenticated response in response to reading of the authenticated response.

Example 24 includes the subject matter of any of Examples 10-23, and wherein: the secure programming module is further to configure, by the invoking enclave, the channel programming information, wherein the channel programming information includes the unencrypted channel key and a random nonce; wherein to verify the authenticated response comprises to verify the authenticated response with the channel programming key and the random nonce.

Example 25 includes the subject matter of any of Examples 10-24, and wherein: the secure programming module is further to invoke, by the invoking enclave, a second processor instruction with the channel programming information as a parameter; and the computing device further comprises a binding module to generate, by the processor, the wrapped programming information based on the channel programming information in response to invocation of the second processor instruction, wherein the wrapped programming information comprises the encrypted channel key and a message authentication code.

Example 26 includes a method for secure cryptographic engine programming, the method comprising: establishing, by a processor of a computing device having secure enclave support, an invoking enclave with the secure enclave support of the processor; configuring, by the invoking enclave, channel programming information, wherein the channel programming information includes a channel identifier and a channel key to be programmed to a cryptographic engine of the computing device; invoking, by the invoking enclave, a processor instruction with the channel programming information as a parameter; generating, by the processor, wrapped programming information based on the channel programming information in response to invoking the processor instruction, wherein the wrapped programming information comprises an encrypted channel key and a message authentication code.

Example 27 includes the subject matter of Example 26, and wherein invoking the processor instruction comprises invoking an EBINDTIO instruction.

Example 28 includes the subject matter of any of Examples 26 and 27, and wherein: configuring the channel programming information comprises configuring a binary structure indicative of the channel programming information; and generating the wrapped programming information comprises modifying the binary structure to generate the wrapped programming information.

Example 29 includes the subject matter of any of Examples 26-28, and wherein generating the wrapped programming information comprises encrypting the channel key with a key wrapping key to generate the encrypted channel key, wherein the key wrapping key is a secret of the processor.

Example 30 includes the subject matter of any of Examples 26-29, and wherein generating the wrapped programming information further comprises generating the message authentication code with the key wrapping key.

Example 31 includes the subject matter of any of Examples 26-30, and further comprising providing, by the invoking enclave, the wrapped programming information to an untrusted kernel mode component of the computing device.

Example 32 includes the subject matter of any of Examples 26-31, and wherein providing the wrapped programming information to the untrusted kernel mode component comprises providing the wrapped programming information to a crypto engine driver of the computing device.

Example 33 includes the subject matter of any of Examples 26-32, and further comprising: receiving, by the invoking enclave, an authenticated response from the untrusted kernel mode component in response to providing the wrapped programming information to the untrusted kernel mode component; and verifying, by the invoking enclave, the authenticated response using the channel key and a random nonce of the channel programming information; wherein configuring the channel programming information comprises generating the random nonce.

Example 34 includes the subject matter of any of Examples 26-33, and further comprising: invoking, by the untrusted kernel mode component, a second processor instruction with the wrapped programming information as a parameter in response to providing the wrapped programming instruction to the untrusted kernel mode component; unwrapping, by the processor, the wrapped programming information to generate the channel programming information in response to invoking the second processor instruction; verifying, by the processor, the channel programming information in response to invoking the second processor instruction; and programming, by the processor, the channel key to the cryptographic engine in response to verifying the channel programming information.

Example 35 includes a method for secure cryptographic engine programming, the method comprising: receiving, by an untrusted kernel mode component of a computing device, wrapped programming information, wherein the wrapped programming information includes an encrypted channel key to be programmed to a cryptographic engine of the computing device; invoking, by the untrusted kernel mode component, a processor instruction with the wrapped programming information as a parameter; unwrapping, by a processor of the computing device, the wrapped programming information to generate channel programming information in response to invoking the processor instruction, wherein the channel programming information includes an unencrypted channel key; verifying, by the processor, the channel programming information; and programming, by the processor, the unencrypted channel key to the cryptographic engine in response to verifying the channel programming information.

Example 36 includes the subject matter of Example 35, and wherein invoking the processor instruction comprises invoking an UNWRAP instruction.

Example 37 includes the subject matter of any of Examples 35 and 36, and wherein the untrusted kernel mode component comprises a crypto engine driver of the computing device.

Example 38 includes the subject matter of any of Examples 35-37, and wherein unwrapping the wrapped programming information to generate the channel programming information comprises decrypting the encrypted channel key with a key wrapping key to generate the unencrypted channel key, wherein the key wrapping key is a secret of the processor.

Example 39 includes the subject matter of any of Examples 35-38, and further comprising: determining, by the processor, whether the wrapped programming information is potentially replayed; and indicating, by the processor, an unwrapping error in response to determining that the wrapped programming information is potentially replayed; wherein unwrapping the wrapped programming information comprises unwrapping the wrapped programming information in response to determining that the wrapped programming information is not potentially replayed.

Example 40 includes the subject matter of any of Examples 35-39, and wherein determining whether the wrapped programming information is potentially replayed comprises: determining whether an invocation counter of the wrapped programming information has a predefined relationship to an internal invocation counter of the processor; and updating the internal invocation counter with the invocation counter of the wrapped programming information in response to verifying the channel programming information.

Example 41 includes the subject matter of any of Examples 35-40, and wherein verifying the channel programming information comprises verifying a message authentication code of the wrapped programming information with the channel programming information.

Example 42 includes the subject matter of any of Examples 35-41, and further comprising: determining, by the processor, whether a target-specific programming check is satisfied in response to verifying the channel programming information; and indicating, by the processor, an error in response to determining that the target-specific programming check is not satisfied; wherein programming the unencrypted channel key to the cryptographic engine further comprising programming the unencrypted channel key to the cryptographic engine in response to determining that the target-specific programming check is satisfied.

Example 43 includes the subject matter of any of Examples 35-42, and wherein: the channel programming information comprises a command to program a DMA channel to secure; and determining whether the target-specific programming check is satisfied comprises determining whether the DMA channel indicated by the channel programming information is already programmed or determining whether a channel identifier table of the crypto engine is full.

Example 44 includes the subject matter of any of Examples 35-43, and wherein: the channel programming information comprises a command to program a DMA channel out of secure; and determining whether the target-specific programming check is satisfied comprises determining whether the DMA channel is already programmed or determining whether the unencrypted channel key matches a current channel key associated with the DMA channel.

Example 45 includes the subject matter of any of Examples 35-44, and wherein programming the unencrypted channel key to the cryptographic engine comprises: determining an index of an available channel identifier table entry of the crypto engine using a crypto engine model maintained by the processor; and writing the channel programming information at the index of the available channel identifier table entry.

Example 46 includes the subject matter of any of Examples 35-45, and further comprising generating, by the processor, an authenticated response based on a programming status in response to verifying the channel programming information.

Example 47 includes the subject matter of any of Examples 35-46, and wherein generating the authenticated response comprises generating a message authentication code over the programming status using the unencrypted channel key and a random nonce of the channel programming information.

Example 48 includes the subject matter of any of Examples 35-47, and further comprising: establishing, by the processor, an invoking enclave using secure enclave support of the processor; reading, by the untrusted kernel mode component, the authenticated response in response to generating the authenticated response; and verifying, by the invoking enclave, the authenticated response in response to reading the authenticated response.

Example 49 includes the subject matter of any of Examples 35-48, and further comprising: configuring, by the invoking enclave, the channel programming information, wherein the channel programming information includes the unencrypted channel key and a random nonce; wherein verifying the authenticated response comprises verifying the authenticated response using the channel programming key and the random nonce.

Example 50 includes the subject matter of any of Examples 35-49, and further comprising: invoking, by the invoking enclave, a second processor instruction with the channel programming information as a parameter; and generating, by the processor, the wrapped programming information based on the channel programming information in response to invoking the second processor instruction, wherein the wrapped programming information comprises the encrypted channel key and a message authentication code.

Example 51 includes a computing device comprising: a processor; and a memory having stored therein a plurality of instructions that when executed by the processor cause the computing device to perform the method of any of Examples 26-50.

Example 52 includes one or more machine readable storage media comprising a plurality of instructions stored thereon that in response to being executed result in a computing device performing the method of any of Examples 26-50.

Example 53 includes a computing device comprising means for performing the method of any of Examples 26-50.

Example 54 includes a computing device for secure cryptographic engine programming, the computing device comprising: means for establishing, by a processor of a computing device having secure enclave support, an invoking enclave with the secure enclave support of the processor; means for configuring, by the invoking enclave, channel programming information, wherein the channel programming information includes a channel identifier and a channel key to be programmed to a cryptographic engine of the computing device; means for invoking, by the invoking enclave, a processor instruction with the channel programming information as a parameter; means for generating, by the processor, wrapped programming information based on the channel programming information in response to invoking the processor instruction, wherein the wrapped programming information comprises an encrypted channel key and a message authentication code.

Example 55 includes the subject matter of Example 54, and wherein the means for invoking the processor instruction comprises means for invoking an EBINDTIO instruction.

Example 56 includes the subject matter of any of Examples 54 and 55, and wherein: the means for configuring the channel programming information comprises means for configuring a binary structure indicative of the channel programming information; and the means for generating the wrapped programming information comprises means for modifying the binary structure to generate the wrapped programming information.

Example 57 includes the subject matter of any of Examples 54-56, and wherein the means for generating the wrapped programming information comprises means for encrypting the channel key with a key wrapping key to generate the encrypted channel key, wherein the key wrapping key is a secret of the processor.

Example 58 includes the subject matter of any of Examples 54-57, and wherein the means for generating the wrapped programming information further comprises means for generating the message authentication code with the key wrapping key.

Example 59 includes the subject matter of any of Examples 54-58, and further comprising means for providing, by the invoking enclave, the wrapped programming information to an untrusted kernel mode component of the computing device.

Example 60 includes the subject matter of any of Examples 54-59, and wherein the means for providing the wrapped programming information to the untrusted kernel mode component comprises means for providing the wrapped programming information to a crypto engine driver of the computing device.

Example 61 includes the subject matter of any of Examples 54-60, and further comprising: means for receiving, by the invoking enclave, an authenticated response from the untrusted kernel mode component in response to providing the wrapped programming information to the untrusted kernel mode component; and means for verifying, by the invoking enclave, the authenticated response using the channel key and a random nonce of the channel programming information; wherein the means for configuring the channel programming information comprises means for generating the random nonce.

Example 62 includes the subject matter of any of Examples 54-61, and further comprising: means for invoking, by the untrusted kernel mode component, a second processor instruction with the wrapped programming information as a parameter in response to providing the wrapped programming instruction to the untrusted kernel mode component; means for unwrapping, by the processor, the wrapped programming information to generate the channel programming information in response to invoking the second processor instruction; means for verifying, by the processor, the channel programming information in response to invoking the second processor instruction; and means for programming, by the processor, the channel key to the cryptographic engine in response to verifying the channel programming information.

Example 63 includes a computing device for secure cryptographic engine programming, the computing device comprising: means for receiving, by an untrusted kernel mode component of a computing device, wrapped programming information, wherein the wrapped programming information includes an encrypted channel key to be programmed to a cryptographic engine of the computing device; means for invoking, by the untrusted kernel mode component, a processor instruction with the wrapped programming information as a parameter; means for unwrapping, by a processor of the computing device, the wrapped programming information to generate channel programming information in response to invoking the processor instruction, wherein the channel programming information includes an unencrypted channel key; means for verifying, by the processor, the channel programming information; and means for programming, by the processor, the unencrypted channel key to the cryptographic engine in response to verifying the channel programming information.

Example 64 includes the subject matter of Example 63, and wherein the means for invoking the processor instruction comprises means for invoking an UNWRAP instruction.

Example 65 includes the subject matter of any of Examples 63 and 64, and wherein the untrusted kernel mode component comprises a crypto engine driver of the computing device.

Example 66 includes the subject matter of any of Examples 63-65, and wherein the means for unwrapping the wrapped programming information to generate the channel programming information comprises means for decrypting the encrypted channel key with a key wrapping key to generate the unencrypted channel key, wherein the key wrapping key is a secret of the processor.

Example 67 includes the subject matter of any of Examples 63-66, and further comprising: means for determining, by the processor, whether the wrapped programming information is potentially replayed; and means for indicating, by the processor, an unwrapping error in response to determining that the wrapped programming information is potentially replayed; wherein the means for unwrapping the wrapped programming information comprises means for unwrapping the wrapped programming information in response to determining that the wrapped programming information is not potentially replayed.

Example 68 includes the subject matter of any of Examples 63-67, and wherein the means for determining whether the wrapped programming information is potentially replayed comprises: means for determining whether an invocation counter of the wrapped programming information has a predefined relationship to an internal invocation counter of the processor; and means for updating the internal invocation counter with the invocation counter of the wrapped programming information in response to verifying the channel programming information.

Example 69 includes the subject matter of any of Examples 63-68, and wherein the means for verifying the channel programming information comprises means for verifying a message authentication code of the wrapped programming information with the channel programming information.

Example 70 includes the subject matter of any of Examples 63-69, and further comprising: means for determining, by the processor, whether a target-specific programming check is satisfied in response to verifying the channel programming information; and means for indicating, by the processor, an error in response to determining that the target-specific programming check is not satisfied; wherein the means for programming the unencrypted channel key to the cryptographic engine further comprising means for programming the unencrypted channel key to the cryptographic engine in response to determining that the target-specific programming check is satisfied.

Example 71 includes the subject matter of any of Examples 63-70, and wherein: the channel programming information comprises a command to program a DMA channel to secure; and the means for determining whether the target-specific programming check is satisfied comprises means for determining whether the DMA channel indicated by the channel programming information is already programmed or determining whether a channel identifier table of the crypto engine is full.

Example 72 includes the subject matter of any of Examples 63-71, and wherein: the channel programming information comprises a command to program a DMA channel out of secure; and the means for determining whether the target-specific programming check is satisfied comprises means for determining whether the DMA channel is already programmed or determining whether the unencrypted channel key matches a current channel key associated with the DMA channel.

Example 73 includes the subject matter of any of Examples 63-72, and wherein the means for programming the unencrypted channel key to the cryptographic engine comprises: means for determining an index of an available channel identifier table entry of the crypto engine using a crypto engine model maintained by the processor; and means for writing the channel programming information at the index of the available channel identifier table entry.

Example 74 includes the subject matter of any of Examples 63-73, and further comprising means for generating, by the processor, an authenticated response based on a programming status in response to verifying the channel programming information.

Example 75 includes the subject matter of any of Examples 63-74, and wherein the means for generating the authenticated response comprises means for generating a message authentication code over the programming status using the unencrypted channel key and a random nonce of the channel programming information.

Example 76 includes the subject matter of any of Examples 63-75, and further comprising: means for establishing, by the processor, an invoking enclave using secure enclave support of the processor; means for reading, by the untrusted kernel mode component, the authenticated response in response to generating the authenticated response; and means for verifying, by the invoking enclave, the authenticated response in response to reading the authenticated response.

Example 77 includes the subject matter of any of Examples 63-76, and further comprising: means for configuring, by the invoking enclave, the channel programming information, wherein the channel programming information includes the unencrypted channel key and a random nonce; wherein the means for verifying the authenticated response comprises means for verifying the authenticated response using the channel programming key and the random nonce.

Example 78 includes the subject matter of any of Examples 63-77, and further comprising: means for invoking, by the invoking enclave, a second processor instruction with the channel programming information as a parameter; and means for generating, by the processor, the wrapped programming information based on the channel programming information in response to invoking the second processor instruction, wherein the wrapped programming information comprises the encrypted channel key and a message authentication code.

The invention claimed is:

1. A computing device for secure cryptographic engine programming, the computing device comprising:
a secure programming module to (i) establish, by a processor of a computing device with secure enclave support, an invoking enclave, (ii) configure, by the invoking enclave, channel programming information, wherein the channel programming information includes a channel identifier and a channel key to be programmed to a cryptographic engine of the computing device, wherein the channel identifier is included in each direct memory access transaction associated with a direct memory access channel of the computing device, and (iii) invoke, by the invoking enclave, a processor instruction with the channel programming information as a parameter; and
a binding module to generate, by the processor, wrapped programming information based on the channel programming information in response to invocation of the processor instruction, wherein the wrapped programming information comprises an encrypted channel key and a message authentication code.

2. The computing device of claim 1, wherein to generate the wrapped programming information comprises to encrypt the channel key with a key wrapping key to generate the encrypted channel key, wherein the key wrapping key is a secret of the processor.

3. The computing device of claim 1, wherein to generate the wrapped programming information further comprises to generate the message authentication code with the key wrapping key.

4. The computing device of claim 1, wherein the secure programming module is further to provide, by the invoking enclave, the wrapped programming information to an untrusted kernel mode component of the computing device.

5. The computing device of claim 4, wherein:
the secure programming module is further to (i) receive, by the invoking enclave, an authenticated response from the untrusted kernel mode component in response to provision of the wrapped programming information to the untrusted kernel mode component, and (ii) verify, by the invoking enclave, the authenticated response with the channel key and a random nonce of the channel programming information; and
to configure the channel programming information comprises to generate the random nonce.

6. A computing device for secure cryptographic engine programming, the computing device comprising:
an unsecure programming module to (i) receive, by an untrusted kernel mode component of a computing device, wrapped programming information, wherein the wrapped programming information includes an encrypted channel key to be programmed to a hardware cryptographic engine of the computing device, and (ii) invoke, by the untrusted kernel mode component, a processor instruction with the wrapped programming information as a parameter; and
an unwrapping engine module to (i) unwrap, by a processor of the computing device, the wrapped programming information to generate channel programming information in response to invocation of the processor instruction, wherein the channel programming information includes an unencrypted channel key, (ii) verify, by the processor, the channel programming information, and (iii) program, by the processor, the unencrypted channel key to the hardware cryptographic engine in response to verification of the channel programming information.

7. The computing device of claim 6, wherein to unwrap the wrapped programming information to generate the channel programming information comprises to decrypt the encrypted channel key with a key wrapping key to generate the unencrypted channel key, wherein the key wrapping key is a secret of the processor.

8. The computing device of claim 6, wherein:
the unwrapping engine module is further to (i) determine whether the wrapped programming information is potentially replayed, wherein to determine whether the wrapped programming information is potentially replayed comprises to compare an invocation counter of the wrapped programming information to an internal invocation counter of the processor, and (ii) indicate, by the processor, an unwrapping error in response to a determination that the wrapped programming information is potentially replayed;
wherein to unwrap the wrapped programming information comprises to unwrap the wrapped programming information in response to a determination that the wrapped programming information is not potentially replayed.

9. The computing device of claim 8, wherein to verify the channel programming information comprises to verify a message authentication code of the wrapped programming information with the channel programming information.

10. The computing device of claim 6, wherein:
the unwrapping engine module is further to (i) determine, by the processor, whether a programming check is satisfied in response to the verification of the channel programming information, and (ii) indicate, by the processor, an error in response to determining that the programming check is not satisfied;
wherein to program the unencrypted channel key to the hardware cryptographic engine further comprising to program the unencrypted channel key to the hardware cryptographic engine in response to a determination that the programming check is satisfied.

11. The computing device of claim 6, wherein to program the unencrypted channel key to the hardware cryptographic engine comprises to:
determine an index of an available channel identifier table entry of the hardware cryptographic engine with a cryptographic engine model maintained by the processor; and
write the channel programming information at the index of the available channel identifier table entry.

12. The computing device of claim 6, wherein the unwrapping engine module is further to generate, by the processor, an authenticated response based on a programming status in response to the verification of the channel programming information.

13. The computing device of claim 12, wherein to generate the authenticated response comprises to generate a message authentication code over the programming status with the unencrypted channel key and a random nonce of the channel programming information.

14. One or more non-transitory, machine readable storage media comprising a plurality of instructions that in response to being executed cause a computing device to:
establish, by a processor of the computing device having secure enclave support, an invoking enclave with the secure enclave support of the processor;
configure, by the invoking enclave, channel programming information, wherein the channel programming information includes a channel identifier and a channel key to be programmed to a cryptographic engine of the computing device, wherein the channel identifier is included in each direct memory access transaction associated with a direct memory access channel of the computing device;
invoke, by the invoking enclave, a processor instruction with the channel programming information as a parameter; and
generate, by the processor, wrapped programming information based on the channel programming information in response to invoking the processor instruction, wherein the wrapped programming information comprises an encrypted channel key and a message authentication code.

15. The one or more non-transitory, machine readable storage media of claim 14, wherein to generate the wrapped programming information comprises to encrypt the channel key with a key wrapping key to generate the encrypted channel key, wherein the key wrapping key is a secret of the processor.

16. The one or more non-transitory, machine readable storage media of claim 14, wherein to generate the wrapped programming information further comprises to generate the message authentication code with the key wrapping key.

17. The one or more non-transitory, machine readable storage media of claim 14, further comprising a plurality of instructions that in response to being executed cause the computing device to provide, by the invoking enclave, the wrapped programming information to an untrusted kernel mode component of the computing device.

18. The one or more non-transitory, machine readable storage media of claim 17, further comprising a plurality of instructions that in response to being executed cause the computing device to:
    receive, by the invoking enclave, an authenticated response from the untrusted kernel mode component in response to providing the wrapped programming information to the untrusted kernel mode component; and
    verify, by the invoking enclave, the authenticated response using the channel key and a random nonce of the channel programming information;
    wherein to configure the channel programming information comprises to generate the random nonce.

19. One or more non-transitory, machine readable storage media comprising a plurality of instructions that in response to being executed cause a computing device to:
    receive, by an untrusted kernel mode component of a computing device, wrapped programming information, wherein the wrapped programming information includes an encrypted channel key to be programmed to a hardware cryptographic engine of the computing device;
    invoke, by the untrusted kernel mode component, a processor instruction with the wrapped programming information as a parameter;
    unwrap, by a processor of the computing device, the wrapped programming information to generate channel programming information in response to invoking the processor instruction, wherein the channel programming information includes an unencrypted channel key;
    verify, by the processor, the channel programming information; and
    program, by the processor, the unencrypted channel key to the hardware cryptographic engine in response to verifying the channel programming information.

20. The one or more non-transitory, machine readable storage media of claim 19, wherein to unwrap the wrapped programming information to generate the channel programming information comprises to decrypt the encrypted channel key with a key wrapping key to generate the unencrypted channel key, wherein the key wrapping key is a secret of the processor.

21. The one or more non-transitory, machine readable storage media of claim 19, further comprising a plurality of instructions that in response to being executed cause the computing device to:
    determine, by the processor, whether the wrapped programming information is potentially replayed, wherein to determine whether the wrapped programming information is potentially replayed comprises to compare an invocation counter of the wrapped programming information to an internal invocation counter of the processor; and
    indicate, by the processor, an unwrapping error in response to determining that the wrapped programming information is potentially replayed;
    wherein to unwrap the wrapped programming information comprises to unwrap the wrapped programming information in response to determining that the wrapped programming information is not potentially replayed.

22. The one or more non-transitory, machine readable storage media of claim 21, wherein to verify the channel programming information comprises to verify a message authentication code of the wrapped programming information with the channel programming information.

23. The one or more non-transitory, machine readable storage media of claim 19, further comprising a plurality of instructions that in response to being executed cause the computing device to:
    determine, by the processor, whether a programming check is satisfied in response to verifying the channel programming information; and
    indicate, by the processor, an error in response to determining that the programming check is not satisfied;
    wherein to program the unencrypted channel key to the hardware cryptographic engine further comprising to program the unencrypted channel key to the hardware cryptographic engine in response to determining that the programming check is satisfied.

24. The one or more non-transitory, machine readable storage media of claim 19, further comprising a plurality of instructions that in response to being executed cause the computing device to generate, by the processor, an authenticated response based on a programming status in response to verifying the channel programming information.

25. The computing device of claim 1, further comprising an input/output controller to include the channel identifier in each direct memory access transaction associated with the direct memory access channel.

* * * * *